(12) United States Patent
Kim et al.

(10) Patent No.: US 10,194,381 B2
(45) Date of Patent: Jan. 29, 2019

(54) METHOD AND APPARATUS FOR PERFORMING DISCOVERY USING MDNS IN WIRELESS COMMUNICATION SYSTEM

(71) Applicant: LG ELECTRONICS INC., Seoul (KR)

(72) Inventors: Dongcheol Kim, Seoul (KR); Byungjoo Lee, Seoul (KR); Hyunhee Park, Seoul (KR); Giwon Park, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/737,046

(22) PCT Filed: Jun. 24, 2016

(86) PCT No.: PCT/KR2016/006744
§ 371 (c)(1),
(2) Date: Dec. 15, 2017

(87) PCT Pub. No.: WO2016/209019
PCT Pub. Date: Dec. 29, 2016

(65) Prior Publication Data
US 2018/0176856 A1 Jun. 21, 2018

Related U.S. Application Data

(60) Provisional application No. 62/184,205, filed on Jun. 24, 2015.

(51) Int. Cl.
*H04W 4/06* (2009.01)
*H04W 48/16* (2009.01)
(Continued)

(52) U.S. Cl.
CPC .............. *H04W 48/16* (2013.01); *H04L 29/08* (2013.01); *H04L 61/1511* (2013.01);
(Continued)

(58) Field of Classification Search
CPC ..... H04L 45/02; H04L 67/141; H04L 67/143; H04L 67/104; H04L 63/061;
(Continued)

(56) References Cited

U.S. PATENT DOCUMENTS 8,559,340 B2 10/2013 Verma et al.
2014/0012967 A1 1/2014 Agarwal et al.
(Continued)

*Primary Examiner* — Kwasi Karikari
(74) *Attorney, Agent, or Firm* — Dentons US LLP

(57) ABSTRACT

The present specification relates to a method for performing service discovery by a first terminal in a wireless communication system. Here, the method for performing service discovery by a first terminal may comprise the steps of: performing a service discovery procedure with a second terminal; and establishing a session connection with the second terminal, wherein the service discovery procedure may be performed through an mDNS on the basis of an ASP. In addition, the service discovery procedure may comprise the steps of: exchanging PTR query messages on the basis of the mDNS; and exchanging SRV and TXT query messages on the basis of the mDNS, wherein the TXT record of the SRV and TXT query message may essentially include advertisement ID information for the service.

8 Claims, 15 Drawing Sheets

(51) Int. Cl.
*H04L 29/08* (2006.01)
*H04W 84/12* (2009.01)
*H04L 29/12* (2006.01)
*H04L 12/18* (2006.01)

(52) U.S. Cl.
CPC ........ *H04L 61/1541* (2013.01); *H04L 61/305* (2013.01); *H04W 4/06* (2013.01); *H04W 84/12* (2013.01); *H04L 12/189* (2013.01)

(58) Field of Classification Search
CPC ............. H04L 61/1511; H04L 61/6068; H04L 12/2807; H04L 12/5692; H04L 47/2408; H04W 76/14; H04W 84/12; H04W 4/70; H04W 24/10
See application file for complete search history.

(56) References Cited

U.S. PATENT DOCUMENTS

| | | |
|---|---|---|
| 2014/0214958 A1 | 7/2014 | Cheshire |
| 2014/0351445 A1 | 11/2014 | Davidson et al. |
| 2014/0366105 A1* | 12/2014 | Bradley ................ H04W 12/08 726/5 |
| 2016/0164933 A1* | 6/2016 | Kafle ................ H04L 65/1069 709/219 |

* cited by examiner

First WFD device (cellular phone)   Second WFD device (display device)

(a)

(b)

METHOD AND APPARATUS FOR PERFORMING DISCOVERY USING MDNS IN WIRELESS COMMUNICATION SYSTEM

This application is a 35 USC § 371 National Stage entry of International Application No. PCT/KR2016/006744 filed on Jun. 24, 2016, and claims priority to U.S. Provisional Application No. 62/184,205 filed Jun. 24, 2015, all of which are hereby incorporated by reference in their entireties as if fully set forth herein.

TECHNICAL FIELD

This specification relates to a wireless communication system and, more particularly, to a method and apparatus for performing discovery using a multicast domain name system (mDNS) in a wireless communication system.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

A standard for a WLAN (wireless local area network) technology is developing by IEEE (institute of electrical and electronics engineers) 802.11 group. IEEE 802.11a and b use an unlicensed band on 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps by applying OFDM (orthogonal frequency division multiplexing) on 2.4 GHz. IEEE 802.11n provides transmission speed of 300 Mbps by applying MIMO-OFDM (multiple input multiple output -orthogonal frequency division multiplexing). IEEE 802.11n supports a channel bandwidth up to 40 MHz. In this case, transmission speed can be provided as fast as 600 Mbps. IEEE 802.11p corresponds to a standard for supporting WAVE (wireless access in vehicular environments). For instance, 802.11p provides improvement necessary for supporting ITS (intelligent transportation systems). IEEE 802.11ai corresponds to a standard for supporting fast initial link setup of IEEE 802.11 station.

A DLS (direct link setup)-related protocol in wireless LAN environment according to IEEE 802.11e is used on the premise of a QBSS (quality BSS) supporting QoS (quality of service) supported by a BSS (basic service set). In the QBSS, not only a non-AP STA but also an AP corresponds to a QAP (quality AP) supporting QoS. Yet, in current commercialized wireless LAN environment (e.g., wireless LAN environment according to IEEE 802.11a/b/g etc.), although a non-AP STA corresponds to a QSTA (quality STA) supporting QoS, most of APs corresponds to a legacy AP incapable of supporting QoS. Consequently, in the current commercialized wireless LAN environment, there is a limit in that a QSTA is unable to use a DLS service.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. A data communication method via direct connection between devices is also used in a legacy communication by some users in a manner of being mounted on a device (e.g., a cellular phone, a note PC, etc.) on which a wireless communication technology such as Bluetooth is mounted. Yet, according to the data communication method, transmission speed is slow and transmission distance is limited to within 10 m. In particular, when the data communication method is used for transmitting massive data or is used in environment at which many Bluetooth devices exist, there exists a technical limit in performance capable of being felt by a user.

Meanwhile, Wi-Fi P2P maintains most of functions of the legacy Wi-Fi standard and includes an additional part for supporting direct communication between devices. Hence, the Wi-Fi P2P can sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed. Yet, software development supporting the Wi-Fi P2P standard is not vitalized yet. This is because, although a Wi-Fi P2P standard is announced, related software capable of conveniently using the Wi-Fi P2P standard is not distributed.

There exists a device playing a role of an AP in a legacy infrastructure network in a P2P group. The device is called a P2P group owner (GO) in a P2P standard. Various P2P clients may exist on the basis of the P2P GO. One GO exists in a single P2P group only and all remaining devices become client devices.

Recently, the use of Bluetooth, NAN (neighboring awareness networking), and NFC (near field communication) is increasing. Hence, it is necessary to have a method of providing a service in environment in which a plurality of systems or interfaces are provided.

DISCLOSURE

Technical Problem

An object of the present invention is to provide a method and apparatus for performing discovery using an mDNS in a wireless communication system.

Another object of the present invention is to provide a method of configuring a message exchanged through an mDNS in a wireless communication system.

Another object of the present invention is to provide a method of operating a user equipment (UE) supporting an application service platform (ASP) in consideration of backward compatibility with a legacy system.

Technical Solution

Advantageous Effects

According to the present invention, it is possible to provide a method and apparatus for performing discovery using an mDNS in a wireless communication system.

According to the present invention, it is possible to provide a method of configuring a message exchanged through an mDNS in a wireless communication system.

According to the present invention, it is possible to provide a method of operating a UE supporting an application service platform (ASP) in consideration of backward compatibility with a legacy system.

The effects which can be obtained by the present invention are not limited to the above-described effects and other effects which are not described herein will become apparent to those skilled in the art from the following description.

BEST MODE

Figure 1:
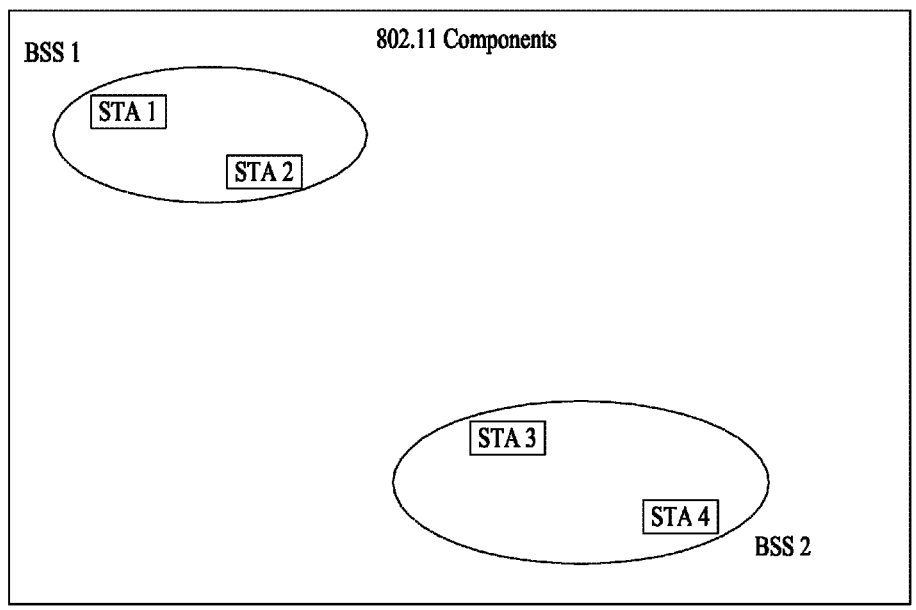
FIG. 1 illustrates a structure of an IEEE 802.11 system to which the present invention can be applied.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 shows an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP can be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA can be called a device, a wireless transmit/receive unit (WTRU), a user equipment (UE), a mobile station (MS), a mobile device, a mobile subscriber station (MSS), and the like.

An oval indicating a BSS in FIG. 1 may be comprehended as a coverage area of the STAs included in the BSS to maintain a communication. This area can be called a basic service area (hereinafter abbreviated BSA). A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA can be associated with the BSS.

Figure 2:
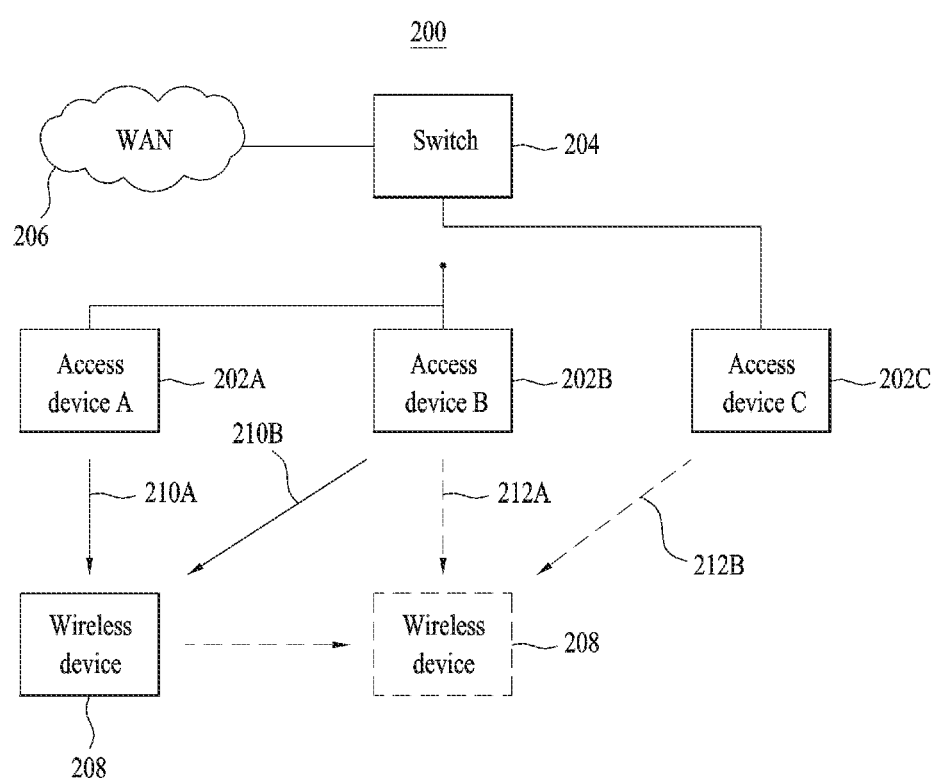
FIG. 2 is a block diagram illustrating an exemplary operation of a communication system employing access devices and wireless devices.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 can receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 can receive beacons from the access devices 202B/202C.

When the wireless device 208 roams in the total WLAN coverage area provided by the system 200, the wireless device 208 can determine which device provides best access to the wireless device 208. For instance, the wireless device 208 repeatedly scans beacons of adjacent access devices and may be able to measure signal strength (e.g., power) related to each of the beacons. Hence, the wireless device 208 can be connected with an access device providing optimal network access based on maximum beacon signal strength. The wireless device 208 may be able to use a different reference related to optimal access. For instance, the optimal access may be associated with more preferable services (e.g., contents, data rate and the like).

Figure 3:
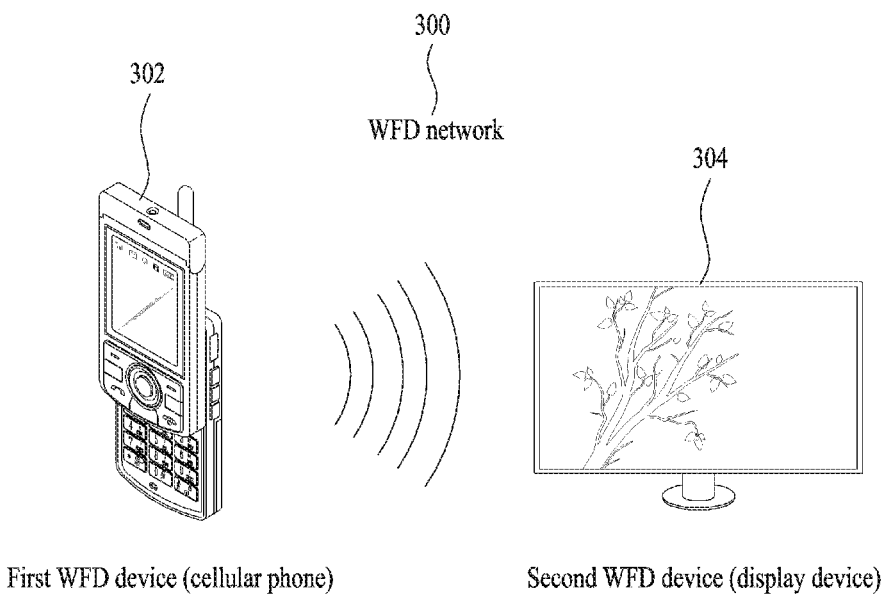
FIG. 3 illustrates a Wi-Fi Direct (WFD) network.

FIG. 3 is a diagram for an example of a WFD (Wi-Fi Direct) network.

A WFD network corresponds to a network capable of performing D2D (device-to-device) (or peer to peer (P2P) communication although Wi-Fi devices do not participate in a home network, an office network or a hot-spot network. The WFD network is proposed by Wi-Fi alliance. In the following, WFD-based communication is called WFD D2D communication (simply, D2D communication) or WFD P2P communication (simply, P2P communication). And, a device performing the WFD P2P communication is called a WFD P2P device, simply, a P2P device.

Referring to FIG. 3, a WFD network 300 can include at least one or more Wi-Fi devices including a first WFD device 302 and a second WFD device 304. A WFD device includes devices supporting Wi-Fi such as a display device, a printer, a digital camera, a projector, a smartphone and the like. And, the WFD device includes a non-AP STA and an AP STA. Referring to an example shown in the drawing, the first WFD device 302 corresponds to a smartphone and the second WFD device 304 corresponds to a display device. WFD devices in the WFD network can be directly connected with each other. Specifically, P2P communication may correspond to a case that a signal transmission path between two WFD devices is directly configured between the WFD devices without passing through a third device (e.g., an AP) or a legacy network (e.g., access WLAN via an AP). In this case, the signal transmission path directly configured between the two WFD devices may be restricted to a data transmission path. For instance, P2P communication may correspond to a case that a plurality of non-STAs transmit data (e.g., audio/image/text message information etc.) without passing through an AP. A signal transmission path for control information (e.g., resource allocation information for P2P configuration, wireless device identification information and the like) can be directly configured between WFD devices (e.g., between a non-AP STA and a non-AP STA), between a non-AP STA and an AP), between two WFD devices (e.g., between a non-AP STA and a non-AP STA) via an AP or between an AP and a corresponding WFD device (e.g., an AP and a non-AP STA #1, between an AP and a non-AP STA #2).

Figure 4:
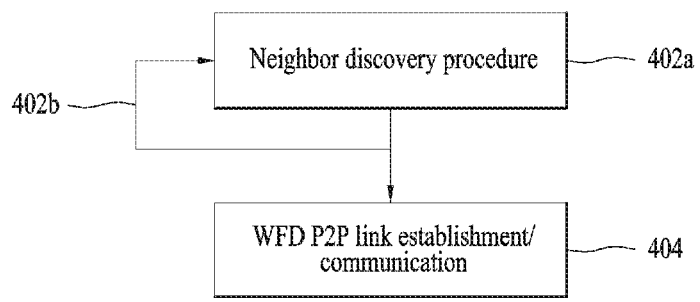
FIG. 4 illustrates a process of constructing a WFD network

FIG. 4 is a flowchart for an example of a procedure of configuring a WFD network.

Referring to FIG. 4, a procedure of configuring a WFD network can be mainly divided into two procedures. A first procedure corresponds to a neighbor (device) discovery (ND) procedure [S402a] and a second procedure corresponds to a P2P link configuration and communication procedure [S404]. A WFD device (e.g., 302 in FIG. 3) finds out a different neighboring device (e.g., 304 in FIG. 3) in coverage (of the WFD device) via the neighbor discovery procedure and may be able to obtain information necessary for associating with the neighboring WFD device, e.g., information necessary for pre-association. In this case, the pre-association may indicate second layer pre-association in a wireless protocol. The information necessary for the pre-association can include identification information on the neighboring WFD device for example. The neighbor discovery procedure can be performed according to an available radio channel [S402b]. Subsequently, the WFD device 302 can perform a WFD P2P link configuration/communication procedure with the different WFD device 304. For instance, the WFD device 302 can determine whether the WFD device 304 corresponds to a WFD device not satisfying a service requirement of a user after the WFD device 302 is connected with the neighboring WFD device 304. To this end, the WFD device 302 is second layer pre-associated with the neighboring WFD device 304 and may be then able to search for the WFD device 304. If the WFD device 304 does not satisfy the service requirement of the user, the WFD device 302 disconnects the second layer connection established with the WFD device 304 and may be able to establish the second layer connection with a different WFD device.

On the contrary, if the WFD device 304 satisfies the service requirement of the user, the two WFD devices 302/304 can transceive a signal with each other via a P2P link.

Figure 5:
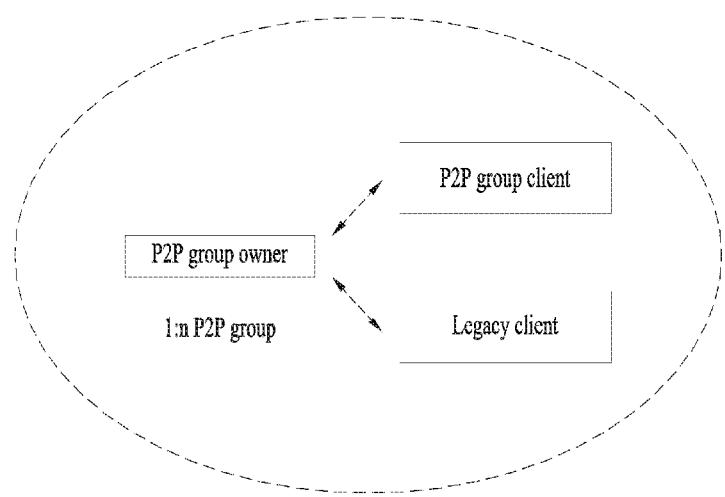
FIG. 5 illustrates a typical P2P network topology.

FIG. 5 is a diagram for a typical P2P network topology.

As shown in FIG. 5, a P2P GO can be directly connected with a client including a P2P function. Or, the P2P GO can be connected with a legacy client, which has no P2P function.

Figure 6:
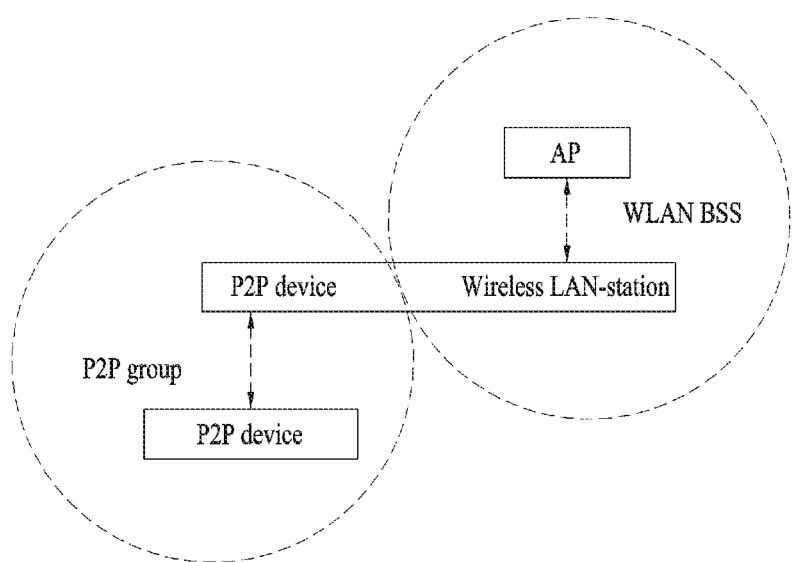
FIG. 6 illustrates a situation in which one P2P device forms a P2P group and, simultaneously, operates as an STA of a WLAN to be connected to an AP.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device can belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n can be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel. According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group can be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal can be transmitted by the P2P GO only. A P2P device can quickly check the P2P GO using the beacon signal in a scan phase corresponding to a connection initial phase and performs a role of participating in the group. Or, the P2P GO can initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer can select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client can also inform the P2P GO of connection release. In this case, if possible, it is necessary to perform a disassociation procedure. Having received a connection release request of a client, the P2P GO can identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
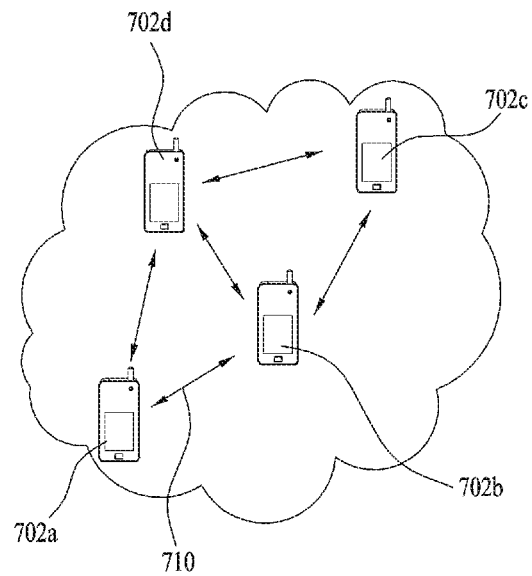
FIG. 7 illustrates a WFD network state when P2P is applied thereto.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself can be newly generated or disappeared dynamically/in a short time. Hence, characteristic of the new P2P application part is in that P2P communication can be performed and terminated dynamically/in a short time between a plurality of the P2P devices in dense network environment.

Figure 8:
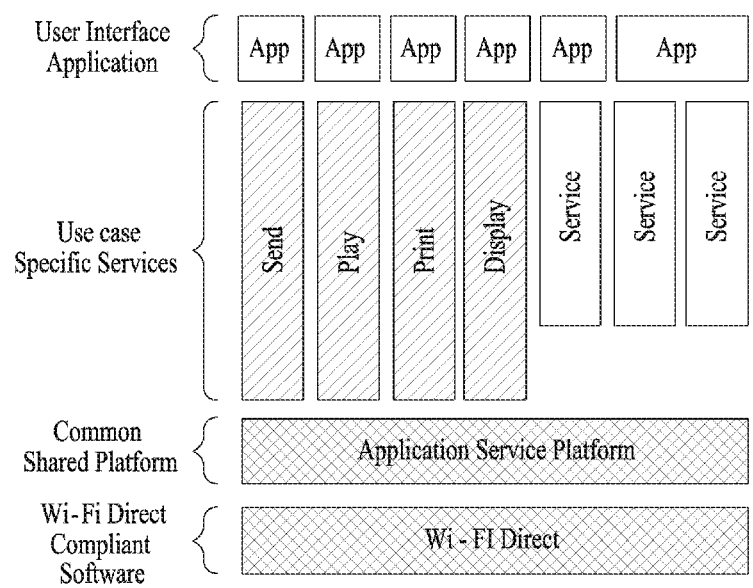
FIG. 8 is a schematic block diagram of a Wi-Fi Direct Services (WFDS) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including contents such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash can be included in a message as information.

Method of Configuring Legacy WFDS

Figure 9:
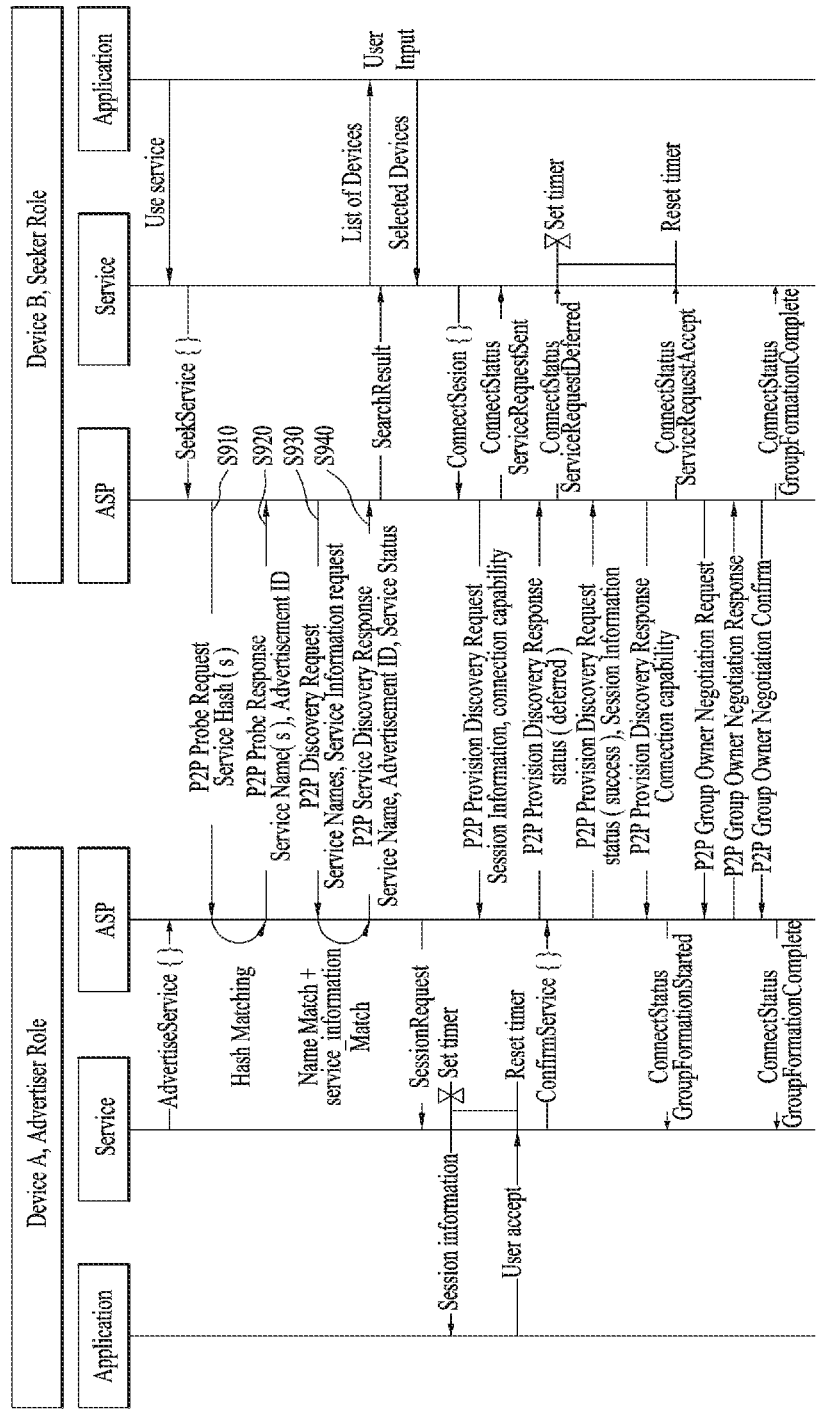
FIG. 9 illustrates a process of performing device discovery and service discovery between WFDS devices to connect a WFDS session in conventional WFDS.

FIG. 9 is a flowchart for a process of establishing a WFDS session by discovering a device and a service between WFDS devices in a legacy WFDS.

For clarity, as shown in FIG. 4, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B can also advertise a WFDS capable of being provided by the service end to an ASP end of the device B. In order for the device B to use a WFDS as a seeker, an application end of the device B indicates a service to be used to the service end and the service end indicates the ASP end to find out a target device to use the WFDS.

In order to find out the target device to use the WFDS, the ASP end of the device B transmits a P2P (peer to peer) probe request message [S910]. In this case, the P2P probe request message includes a service name, which is intended to be found out by the ASP end of the device B or is capable of being supported by the ASP end of the device B, in a service hash form in a manner of hashing the service name. Having received the P2P probe request message from the seeker, if the device A supports the corresponding service, the device A transmits a P2P probe response message to the device B in response to the P2P probe request message [S920]. The P2P probe response message includes a service supported by a service name or a hash value and a corresponding advertise ID value. This procedure corresponds to a device discovery procedure indicating that the device A and the device B are WFDS devices. It is able to know whether a service is supported via the device discovery procedure.

Subsequently, it is able to know a specific service in detail via a P2P service discovery procedure, optionally. The device B, which has found a device capable of performing a WFDS with the device B, transmits a P2P service discovery request message to the device [S930]. Having received the P2P service discovery request message from the device B, the ASP end of the device A transmits a P2P service discovery response message to the device B in a manner of matching the service advertised by the service end of the device A with a P2P service name and a P2P service information received from the device B with each other [S940]. In this case, a GAS protocol defined by IEEE 802.11u is used. As mentioned in the foregoing description, when a request for a service search is completed, the device B can inform an application and a user of a search result. At this point, a group of Wi-Fi Direct is not formed yet. If a user selects a service and the selected service performs a connect session, P2P group formation is performed.

In addition, in one embodiment of the present invention, an APS operating based on at least one of WFA, WFDS, Wi-Fi Direct, NAN (Neighbor Awareness Networking), NFC (Near Field Communication), BLE (Bluetooth Low Energy) and WLAN Infrastructure may be provided. At this time, the WFDS, etc. may be one interface. That is, the interface may refer to a method of supporting operation of a UE. At this time, a method of linking an ASP with device/service discovery based on the above-described interfaces will be described.

Figure 10:
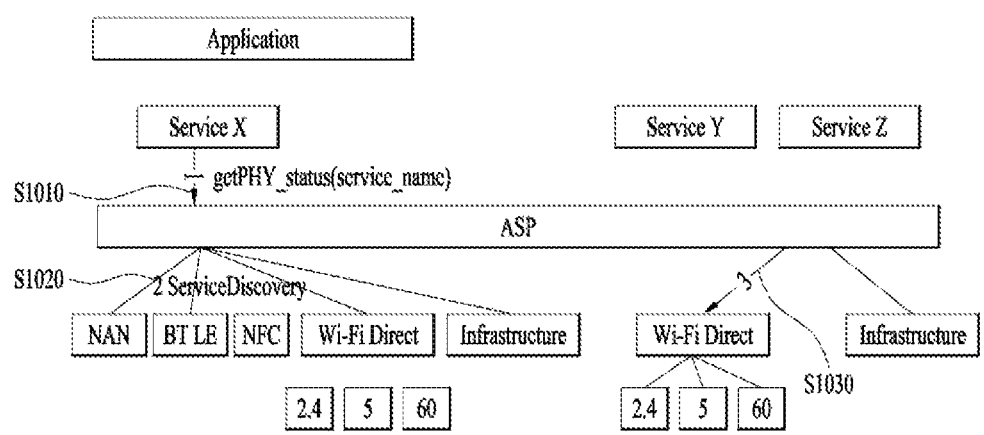
FIG. 10 is a diagram showing an application service platform (ASP) supporting a plurality of interfaces.

FIG. 10 is a diagram showing an application service platform (ASP) supporting a plurality of interfaces.

As described above, a service stage of an advertiser UE as a UE supporting WFDS advertises a service capable of being provided thereby and a service stage of a seeker UE as another UE supporting WFDS may instruct an ASP stage to seek a target apparatus which will use the service again. That is, conventionally, WFDS between UEs may be supported through the ASP.

At this time, referring to FIG. 10, the ASP may support a plurality of interfaces. At this time, for example, the ASP may support a plurality of interfaces for performing device discovery. In addition, the ASP may support a plurality of interfaces for performing service connection.

At this time, for example, the plurality of interfaces for performing service discovery may be at least one of Wi-Fi Direct, NAN (Neighbor Awareness Networking), NFC (Near Field Communication), BLE (Bluetooth Low Energy) and WLAN Infrastructure.

In addition, the plurality of interfaces for performing service connection may be at least one of Wi-Fi Direct, P2P and WLAN Infrastructure. In addition, for example, the ASP may support a plurality of frequency bands. At this time, for example, the plurality of frequency bands may be 2.4 GHz, 5 GHz, 60 GHz, etc. In addition, for example, information on a frequency band of less than 1 GHz may be supported. That is, the ASP may support a plurality of frequency bands, without being limited to a specific frequency band.

Referring to FIG. 10, a first UE may perform device discovery or service discovery with respect to a first service using an ASP. Thereafter, when device discovery or service discovery is finished, service connection may be performed based on the search result. At this time, for example, an interface used for service discovery and an interface implemented upon service connection may be different from each other and may be selected from among the plurality of interfaces.

Accordingly, definition of information or parameters for supporting the plurality of interfaces in the ASP may be necessary. Hereinafter, information or parameters for providing a service using an ASP supporting a plurality of interfaces will be described.

In association with the ASP, for example, a service stage of a UE may acquire information on a service discovery method and a connectivity method capable of supporting a first service from the ASP. At this time, the first service may be one service provided by the UE, without being limited to a specific service.

The service stage of the UE may call an Advertise Service( ) or SeekService( ) method from the ASP based on the information acquired from the ASP. That is, the UE may use the ASP as an advertiser or a seeker in order to perform service discovery of the first service, which may be equal to existing ASP operation. In addition, the UE may perform service connection based on the service discovery result, after performing service discovery of the first service. At this time, service connection may be P2P or WLAN Infrastructure. At this time, for example, since two service connections support a plurality of frequency bands, connection may be performed based on a preferred band.

More specifically, referring to FIG. 10, the service stage of the UE may call a getPHY_status(service_name) method to transmit a message for a service to be used to the ASP. At this time, the service stage may receive a Return value from the ASP and acquire information on the plurality of frequency bands of a service discovery method and a service connectivity method supported by the ASP. The UE may inform the ASP of a preferred connectivity method and preferred frequency band information of the service and acquire information on the service discovery method and the service connectivity method supported by the ASP. The ASP may perform service discovery based on the information received from the service stage and find and connect a specific device to use the service.

The WLAN infrastructure, P2P and ASP supporting the same have been described above.

Hereinafter, a method of performing discovery at a UE in the WLAN Infrastructure based on the above description will be described.

Figure 11:
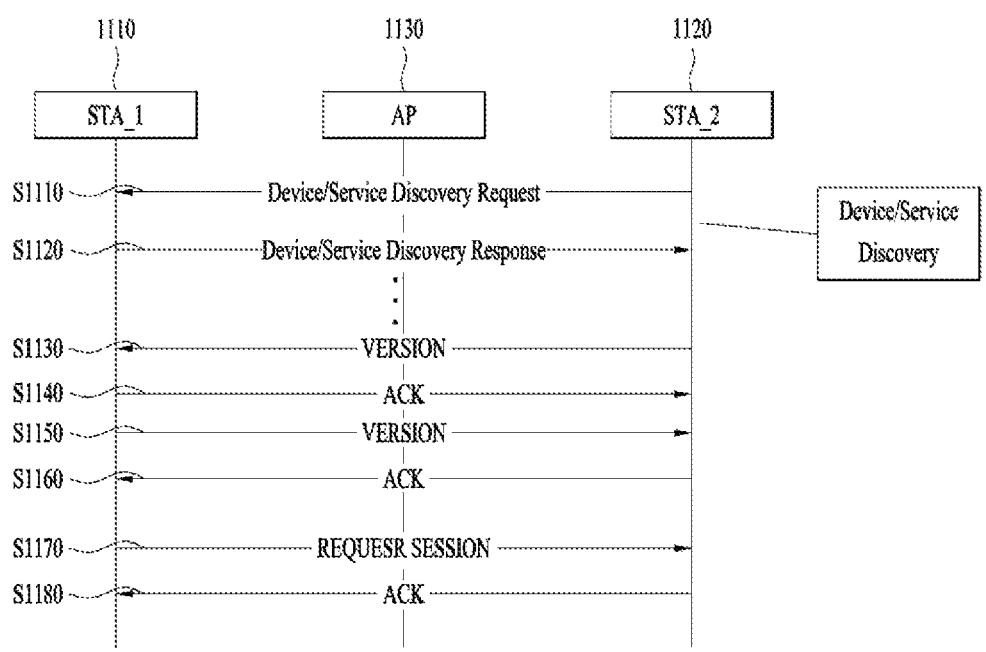
FIG. 11 is a diagram showing a method of, at a UE, performing discovery using a WLAN infrastructure.

FIG. 11 is a diagram showing a method of, at a UE, performing discovery using a WLAN infrastructure.

The UE may perform discovery using the WLAN Infrastructure. At this time, as described above, the UE may support a specific service as a seeker or an advertiser and perform discovery for supporting the specific service. For example, the UE may perform discovery using the WLAN Infrastructure. At this time, the UE may perform discovery using an ASP supporting the WLAN Infrastructure as an ASP supporting a plurality of interfaces as described above. In addition, for example, the UE may perform discovery using the WLAN Infrastructure regardless of the ASP, without being limited to the above-described embodiment.

For example, referring to FIG. 11, a first UE (STA_1) 1110 may transmit a discovery request message to a second UE (STA_2) 1120 using an access point (AP) 1130 of the WLAN Infrastructure (S1110). At this time, the discovery request message may be transmitted in the form of a discovery request frame.

In addition, the discovery request message may be transmitted through the AP as the WLAN Infrastructure using a broadcast or multicast method. That is, the first UE 1110 may transmit the discovery request message to a plurality of UEs through the AP.

In addition, for example, device and service request information may be transmitted in one message. In addition, for example, the first UE 1110 may transmit a message for requesting only device discovery to the second UE 1120. In addition, for example, the first UE 1110 may transmit a message for requesting only service discovery to the second UE 1120. That is, the first UE 1110 may transmit device and/or service discovery request message, without being limited to the above-described embodiment.

In addition, for example, when the first UE 1110 transmits the discovery request message to the second UE 1120 using the WLAN Infrastructure based on the ASP, the first UE 1110 may be the above-described seeker UE. In addition, the second UE 1120 may be the above-described advertiser UE. That is, the UE may perform discovery using the WLAN Infrastructure based on the above-described ASP. At this time, the second UE 1120 may transmit a discovery response message to the first UE 1110 based on the discovery request message (S1120). At this time, for example, the discovery response message may be transmitted based on a discovery response frame.

In addition, for example, the discovery response message may be transmitted through the AP as the WLAN Infrastructure using a unicast method. That is, the second UE 1120 may transmit the discovery response message to only the first UE 1110 through the AP in response to the discovery request message.

As another example, the device and service request information may be transmitted in one message. In addition, for example, the second UE 1120 may receive a device discovery request message and transmit a device discovery response message to the first UE 1120. In addition, for example, the second UE 1120 may receive a service discovery request message and transmit a service discovery response message to the first UE 1110. That is, the first UE 1120 may transmit the device and/or service discovery response message, without being limited to the above-described embodiment.

Thereafter, the first UE 1110 and the second UE 1120 may perform processes S1130, S1140, S1150 and S1160 of checking version information. Therefore, protocol information and compatibility information supported by each UE may be exchanged. Thereafter, the first UE 1110 may transmit a session request message to the second UE 1120 (S1170) and receive an ACK message from the second UE 1120 (S1180), thereby performing session connection. That is, the UE may perform discovery using the WLAN Infrastructure to perform session connection.

Figure 12:
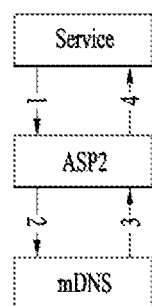
FIG. 12 is a diagram showing a method of performing discovery through an mDNS.
Figure 12:
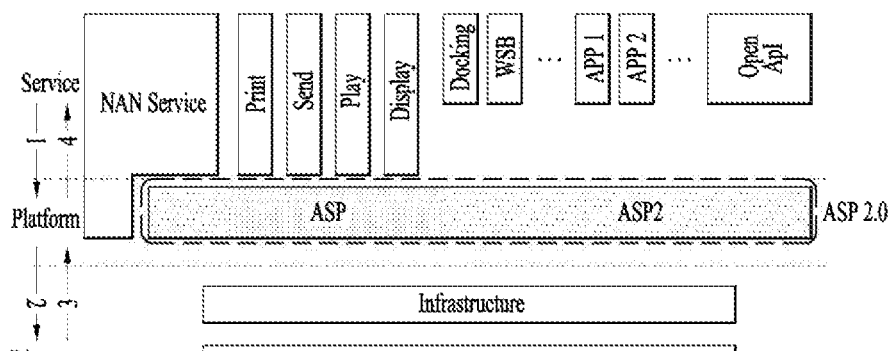

FIG. 12 is a diagram showing a method of performing discovery through an mDNS.

As described above, the UE may perform discovery using the WLAN Infrastructure based on the ASP supporting a plurality of interfaces. At this time, for example, when the UE performs discovery using the WLAN Infrastructure, the UE may perform discovery using the mDNS.

At this time, the mDNS may be a service used to seek a host name with zero configuration in a local network region. At this time, the mDNS may be a system for seeking a host or a UE without using a separate name server in a local or small network environment. At this time, for example, the mDNS may be similar to an existing DNS system but may be different therefrom in that multicast technology is used. More specifically, the UE or client supporting the mDNS may transmit an IP multicast query message in order to know a host name At this time, the UE or client supporting the mDNS may transmit identification information thereof such as a host name and an IP address thereof along with the IP multicast query message.

The IP multicast query message transmitted by the UE or client supporting the mDNS through multicast may be transmitted to the other UEs or hosts. At this time, the other UEs or hosts, which have received the IP multicast query message, may update an mDNS cache based on the received information.

At this time, for example, the UE may search for UEs participating in a local network using the mDNS based on a service type. The UE may set a specific service type in the local network using the mDNS to perform service search. At this time, a plurality of UEs corresponding to the specific service type may be searched for. For example, the plurality of UEs corresponding to the specific service type, such as a printer and a display, may be searched for using the mDNS. At this time, the UE may perform service discovery of a service type using DNS-SD (Service Discovery). At this time, for example, records used in DNS-SD may include a pointer (PTR) record, a service (SRV) record and a text (TXT) record, which will be described below.

That is, the UE may perform UE or host discovery using the mDNS without a separate server.

At this time, for example, when discovery is performed using the WLAN infrastructure based on the ASP using the plurality of interfaces, the UE may perform device/service discovery using the mDNS and perform ASP session connection. At this time, the UE operating based on the ASP may perform device/service discovery using the mDNS in consideration of backward compatibility with a legacy system.

Referring to FIGS. 12a and 12b, the service/application stage of the UE may call a method for service discovery from the ASP stage. More specifically, the service/application stage may call an advertiseService( ) for service advertisement. Thereafter, the ASP stage of the UE may register a service with the mDNS to perform service discovery. That is, the ASP stage of the UE may convert information on service advertisement into an interface suitable for mDNS. Thereafter, the UE may perform device/service discovery based on a service discovery procedure for the mDNS.

In contrast, when discovery of the service registered with the mDNS ends, the UE may call a search result event from the ASP stage to provide search result information to the ASP stage. Thereafter, the ASP stage of the UE may provide the search result to the service/application stage of the UE to end the discovery procedure. That is, the ASP stage of the UE may change the search information to information on the ASP based on the transferred search result and provide the information to the service/application stage of the UE.

In addition, the same is true in the case where a SeekService( ) method is called as the case where the UE performs discovery.

That is, when the UE operates based on the ASP, the UE may use the mDNS for device/service discovery.

Since the UE operates based on the ASP and performs ASP session connection after device/service discovery, information on the ASP session needs to be acquired in advance. In addition, as described above, the ASP may support a plurality of interfaces or only P2P connection. Accordingly, as the case where the UE performs discovery using the WLNA Infrastructure, when discovery is performed through the mDNS, information on the ASP session needs to be exchanged.

At this time, for example, as the WFDS, a service name used in the ASP supporting only P2P connection may take a format of "org.wifi.example" as described above and more detailed service names are shown in Table 1 below.

TABLE 1

| Service Name |
| --- |
| org.wi-fi.wfds.send.tx |
| org.wi-fi.wfds.send.rx |
| org.wi-fi.wfds.send |
| org.wi-fi.wfds.play.tx |
| org.wi-fi.wfds.play.rx |
| org.wi-fi.wfds.play |
| org.wi-fi.wfds.display.tx |
| org.wi-fi.wfds.display.rx |
| org.wi-fi.wfds.display |
| org.wi-fi.wfds.print.tx |
| org.wi-fi.wfds.print.rx |
| org.wi-fi.wfds.print |

In addition, the service name of the service used in the ASP supporting the plurality of interfaces may be defined. At this time, for example, when the UE performs discovery using the mDNS, the above-described service names may be included in at least one of the PTR record, the SRV record and the TXT record used in the mDNS. At this time, the above-described service names may be switched or mapped based on the record format used in the mDNS.

More specifically, when the ASP stage of the UE registers a service in order to use the mDNS, the PTR record, the SRV record and the TXT record may be generated.

At this time, for example, when the SeekService( ) method of the seeker UE is called, the seeker UE may transmit a query message to the advertiser UE based on the PTR record. At this time, for example, the PTR record may take the format of "<Service Name>.<Transport Protocol>.<Domain Name>". For example, when display service discovery is performed, the PTR record may be "_display._tcp.local PTR". That is, the PTR record may be defined by a specific service type. The seeker UE may search for the advertiser UE for providing a desired service type thereof through a query message based on the PTR record. The ASP may be divided into an ASP supporting a plurality of interfaces and an ASP supporting only P2P connection as a WI-DS. At this time, when the query message of the format of "<Service Name>.<Transport Protocol>.<Domain Name>" is transmitted as the PTR record, division of the ASP may be unclear.

At this time, for example, the format of the PTR record needs to be defined using a service type with respect to the PTR record to distinguish the ASP. For example, the format of the PTR record may be defined as "<subtype of service type>._sub. <Service Name>.<Transport Protocol>.<Domain Name>". At this time, for example, a part for identifying the PTR record used in the ASP supporting only P2P connection as the WFDS may be "<subtype of service type>._sub.". More specifically, the above-described part may be "_wfds-example._sub.".

Table 2 below shows an example of PTR record information for a WFDS display service.

TABLE 2

| PTR information for WFDS service |
| --- |
| "_wfds-display._sub._display.tcp.local PTR" |
| "_wfds-display-tx._sub._display.tcp.local PTR" |

TABLE 2-continued

PTR information for WFDS service

"_wfds-display-rx._sub._display.tcp.local PTR"
"_wfds-display._sub._display.tcp.local PTR"

In addition, for example, the part for distinguishing the PTR record used in the ASP supporting the plurality of interfaces may be "<subtype of service type>._sub.". More specifically, the above-described part may be "_example2._sub.".

Table 3 below shows an example of PTR record information for a display service used in the ASP supporting the plurality of interfaces.

TABLE 3

PTR record information for Display R2 service

"_display2-tx._sub._display.tcp.local PTR"
"_display2-rx._sub._display.tcp.local PTR"
"_display2._sub._display.tcp.local PTR"
"_display2.tcp.local PTR"
"_rx._sub. _display2.tcp.local PTR"
"_tx._sub. _display2.tcp.local PTR"
"_both._sub. _display2.tcp.local PTR"

In addition, for example, a service type may be registered with the IANA (Internet Assigned Numbers Authority) supporting the mDNS in order to include service type information in the PTR record. The service type information may be registered with the mDNS. Alternatively, for example, the service type may be vendor-specifically defined.

That is, when the service type information is registered with the system, the service type information may be included in the PTR record to perform discovery.

For example, as a service type for a Send service as the WFDS service, "_send.tcp" or "_wfdssend.tcp" may be registered with the system. At this time, discovery may be performed by adding the service type information to the PTR record as a subtype on the assumption that the above-described service type has been registered. At this time, Table 4 below shows an embodiment of information for adding a subtype as the Send service of the WFDS and performing discovery.

TABLE 4

PTR record information

"_tx._sub. _send.tcp.local PTR" or "_tx._sub._wfdssend.tcp.local PTR"
"_rx._sub. _send.tcp.local PTR" or "_rx._sub._wfdssend.tcp.local PTR"
"_both._sub. _send.tcp.local PTR" or
"_both._sub. _wfdssend.tcp.local PTR"

In addition, for example, as a service supporting the ASP supporting the plurality of interfaces, as the service type, "asp2" or "asp2-xxx" may be registered with the system. At this time, for example, in "asp2-xxx", "xxx" may be defined to individually use a specific service type. That is, other services based on the ASP may be defined and may be set as a region for services which may be used in the future.

As another example, when an ASP Coordination Protocol is registered with the IANA, the service type information may be used. That is, when the ASP Coordination Protocol is registered with the mDNS, the service type information may be used for the PTR record. As the ASP, the ASP supporting only P2P connection or the ASP supporting the plurality of interfaces needs to be distinguished. At this time, for example, if the ASP Coordination Protocol is supported, the ASP may be distinguished in "aspcoordination.udp" using "_asp2" or "_v2" as a subtype. More specifically, services using the ASP Coordination Protocol in the form of "_asp2-specific service type" may be discovered. At this time, as a subtype, the ASP may be distinguished through an "_asp2" part. As another example, the configuration of the subtype may be further extended to be used as information for distinguishing a specific service type, without being limited to the above-described embodiment.

That is, when the UE operating based on the ASP performs discovery using WLAN Infrastructure, the UE may perform discovery using the mDNS. At this time, the UE may include the service type information in the PTR record used in the mDNS to perform discovery. At this time, the service type information may be differently set according to ASP, as described above.

Figure 13:
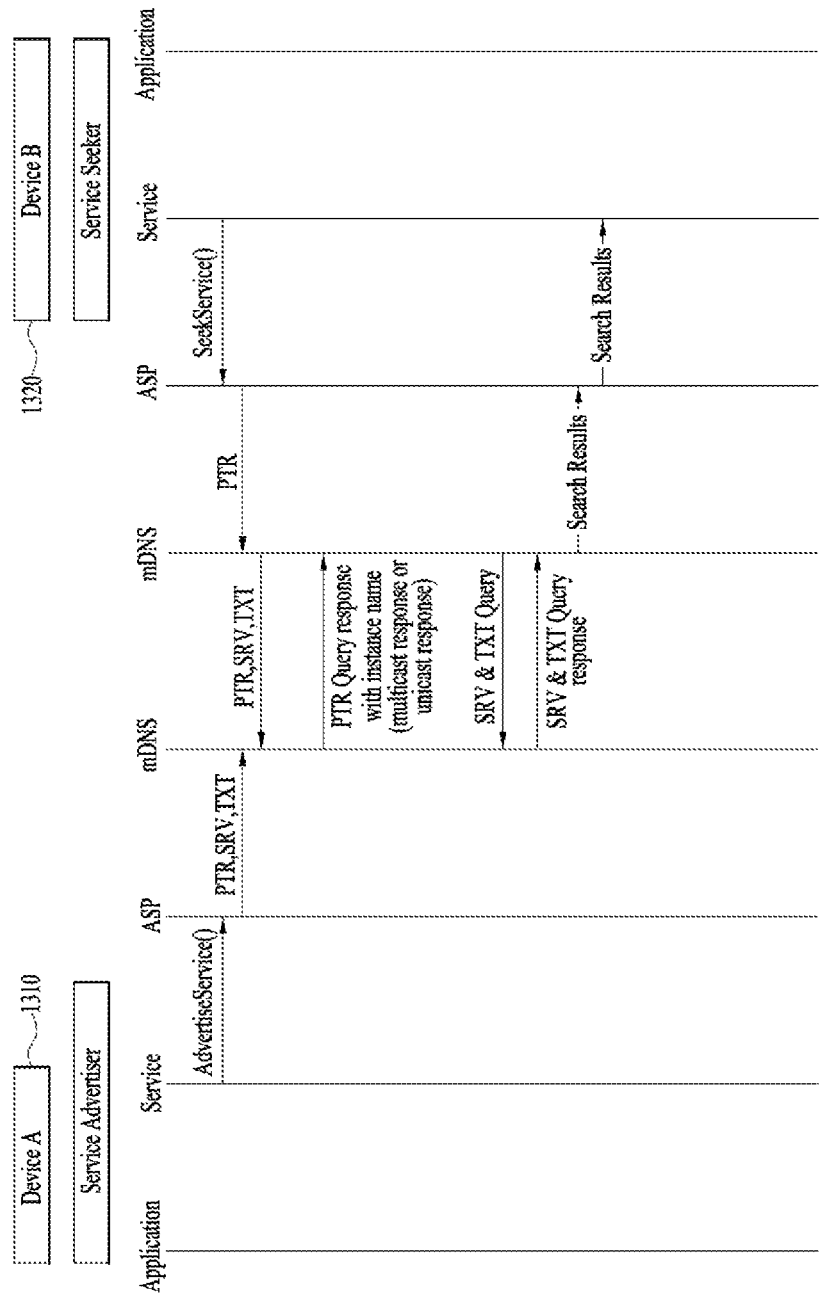
FIG. 13 is a diagram showing a method of performing discovery based on an mDNS.

FIG. 13 is a diagram showing a method of performing discovery based on an mDNS. As described above with reference to FIG. 12, the ASP of a seeker UE 1320 may receive a call for a SeekService( ) method from the service/application stage. Thereafter, the ASP of the seeker UE may convert service information into an mDNS interface, and transmit a PTR query message to the advertiser UE 1310 using the mDNS.

At this time, the ASP of the advertiser UE 1310 may receive a call for an AdvertiserService( ) method from the service/application stage. At this time, the ASP of the advertiser UE 1310 may convert service information into an mDNS interface and advertise a service using the mDNS. At this time, for example, when the service information is converted into the mDNS interface (or the service is registered with the mDNS), a PTR record, an SRV record and a TXT record may be generated.

At this time, the PTR record may take the form of "<Service Name>.<Transport Protocol>.<Domain Name>", as described above. Alternatively, for example, the PTR record may take the form of "<Service Type>.<Domain>". At this time, for example, the form of the PTR record based on the service type for the printer may be equal to "printer._tcp.local. PTR" or "PrintsAlot._printer._tcp.local. PTR".

At this time, the PTR record may include service name information as service type information and may become the pointer of a specific SRV record. In addition, the SRV record may take the form of "<Instance Name>.<Service Name>.<Transport Protocol>.<Domain Name>". In addition, for example, the SRV record may take the form of "<Instance Name>.<Service Type>.<Domain>". At this time, for example, if the SRV record is "_service._proto-.name TTL class SRV priority weight port target.", each piece of information is shown in Table 5 below.

TABLE 5

"_service": the symbolic name of the desired service.
_http - web service
_ftp - file transfer service
ldap - LDAP service
imap - IMAP mail service
_PKIXREP - PKIX Repository (X.509 certificates)
"proto": the transport protocol of the desired service; this is usually either TCP or UDP.
"name": the domain name for which this record is valid, ending in a dot.
"TTL": standard DNS time to live field. (Optional)
"class": standard DNS class field (this is always IN). (Optional)
"IN" indicates Internet
"priority": the priority of the target host, lower value means more preferred.
"weight": A relative weight for records with the same priority, higher TABLE 5-continued value means more preferred.
"port": the TCP or UDP port on which the service is to be found.
"target": the canonical hostname of the machine providing the service, ending in a dot.

At this time, the SRV record may include information on Instance Name. A UE which substantially uses a service may be specified based on the Instance Name included in the SRV record. In addition, the TXT record may take the same form as the above-described SRV record. In addition, for example, the TXT record may include additional information of a service instance. At this time, the TXT record may include additional information based on key-value pair attributes. At this time, for example, the information included in the TXT record may include information on a specific service.

That is, the advertiser UE 1310 may generate a PTR record, an SRV record and a TXT record based on a service advertised as a supportable service.

At this time, referring to FIG. 13, the advertiser UE 1310 may receive a PTR query message based on the mDNS in a state of generating the PTR record, the SRV record and the TXT record. At this time, the advertiser UE 1310 may perform matching of the service type included in the PTR record based on the PTR query message. At this time, the advertiser UE 1310 may transmit a PTR query response message to the seeker UE 1320 based on the matched result. At this time, the PTR query response message may include Instance Name information. For example, the Instance Name information may include host name and IP address information. That is, the Instance Name information may include name information and IP information of the advertiser UE 1310.

The seeker UE 1320 may search for the advertiser UE supporting the specific service type, upon receiving the query response message from the advertiser UE 1310. At this time, for example, there may be a plurality of advertiser UEs 1310. That is, all advertiser UEs supporting the specific service may be searched for. Thereafter, the seeker UE may transmit an SRV and/or TXT query message to the advertiser UE 1310. At this time, the seeker UE 1320 may transmit the SRV and/or TXT query message to a specific port or a specific host based on the Instance Name information. That is, the seeker UE 1310 may specify the advertiser UE 1310 using the Instance Name information. At this time, the seeker UE 1320 may transmit the SRV and/or the TXT query message in order to acquire information on the specified advertiser UE 1310. At this time, the advertiser UE 1310 may transmit an SRV and/or TXT query response message based on the SRV and/or TXT query message. Therefore, the seeker UE 1320 may acquire information on the advertiser UE and end discovery. Thereafter, the seeker UE 1320 may provide the search result information to the ASP stage through interface conversion in the mDNS. The ASP stage of the seeker UE 1320 may call a Search Result event and provide information on the search result to the service/application stage.

Thereafter, the seeker UE 1320 and the advertiser UE 1310 may perform session connection.

At this time, for example, the seeker UE 1320 and the advertiser UE 1310 may exchange information on session connection based on the SRV and/or TXT query message. Accordingly, at least one of the SRV record and the TXT record include information on Table 6 below. More specifically, the seeker UE 1320 and the advertiser UE 1310 may use the mDNS as the discovery method for ASP session connection. Accordingly, as information on an ASP session, at least one of ASP CP network type information, information on whether a plurality of sessions is set up and information on whether operation is performed in a plurality of bands may be included. In addition, as described above, as a connectivity method, WLAN Infrastructure or P2P connection may be used and thus information on the connectivity method may be included. For example, information on a band used for connection and a channel list may be included.

TABLE 6

ASP CP network type
Multiple session capa.
Multiple band operation capa.
Connectivity method and its detail info.
Infra.
  >Band/channel, channel list
P2P
  >Band/channel, channel list In addition, for example, information on ASP session connection may be included in the TXT record as additional information of a service in the form of a key-value pair. For example, the information included in the TXT record is shown in Table 7 below. At this time, for example, the information included in Table 7 may be any one of mandatorily included information M, optionally included information O and default information D in the TXT record.

For example, the Advertisement ID is a return value generated when the ASP stage of the advertiser UE calls an AdvertiseService( ) method and may be maintained while the service is advertised. At this time, for example, the Advertisement ID may be information which is mandatorily included in the TXT record. That is, the Advertisement ID may be mandatory information as ID information indicating the advertised service. In addition, the other information is included in a frame exchanged in a session connection process after performing discovery using the mDNS as information on the session, and may be optional.

As another example, Service MAC may be information mandatorily included in the TXT record. At this time, Service MAC may be the MAC address information of the advertiser UE 1310. For example, if the connectivity method is WLAN Infrastructure, Service MAC Infra may be mandatorily included in the TXT record as the address of the WLAN Infrastructure interface.

In addition, for example, if the connectivity method is P2P, Service MAC P2P may be mandatorily included in the TXT record as the address of the P2P device.

That is, the Service MAC information may be the MAC address information of the advertiser UE 1310 and information on any one of Service MAC Infra and Service MAC P2P may be mandatorily included in the TXT record. At this time, Service MAC information and Advertisement ID may be information used for the service/application stage of the seeker UE 1320 to call a ConnectSession( ) method. Thereafter, the seeker UE 1320 may perform ASP session connection with the advertiser UE 1310.

In addition, if the ConnectSession( ) method is called, at least one of Session Info, P2P Network role and P2P Config Method information may be mandatorily included in the TXT record. That is, information necessary for ASP session connection may be defined and included in the TXT record as mandatory information.

The other information may be included as mandatory, optional or default information, without being limited to the above-described embodiment.

TABLE 7

| Key name | Value/Description | Note |
| --- | --- | --- |
| Advertisement_id | The return value when the ASP calls AdvertiseService( ) is represented using a size value of 4 bytes. | M/O/D |
| Session Info | Service specific information necessary for each service is represented. | M/O/D |
| Service MAC Infra | The MAC address of the advertiser is represented. An infrastructure interface address is represented. This is information necessary for a connectSession( ) method and may or may not be included according to Connectivity method. | M/O/D |
| Service MAC p2p | The MAC address of the advertiser is represented. A P2P device address is represented. This is information necessary for a connectSession( ) method and may or may not be included according to Connectivity method. | M/O/D |
| ASPNetwork | An IP or Non-IP is indicated and is set in the form of UTF-8 encoded text and IP mapped to 0 and Non-IP mapped to 1 may be used. | M/O/D |
| Multi Session Capa | Whether multiple ASP sessions are supported is indicated in the form of Yes or No. | M/O/D |
| Multiple band Capa | Bands supported by a combination of 2.4 GHz, 5 GHz and 60 GHz are indicated. For example, bands supported in the form of UTF-8 encoded text are used as follows: "2.4 GHz", "2.4 GHz 5 GHz". A necessary format is used. Alternatively, a list of combinations made using a method other than text may be generated in the form of a table to use index information. | M/O/D |
| Band preference | As supported band capa, preferred band information is represented. | M/O/D |
| Connectivity Method | The supported method of WLAN Infrastructure and Wi-Fi P2P is represented. One or two methods may be represented in the form of UTF-8 encoded text or various methods such as mapping or index are possible. | M/O/D |
| P2P Network role | The value defined in WFDS specification is represented using various methods. | M/O/D |
| P2P Config Method | The value defined in WFDS specification is represented using various methods. | M/O/D |

Figure 14:
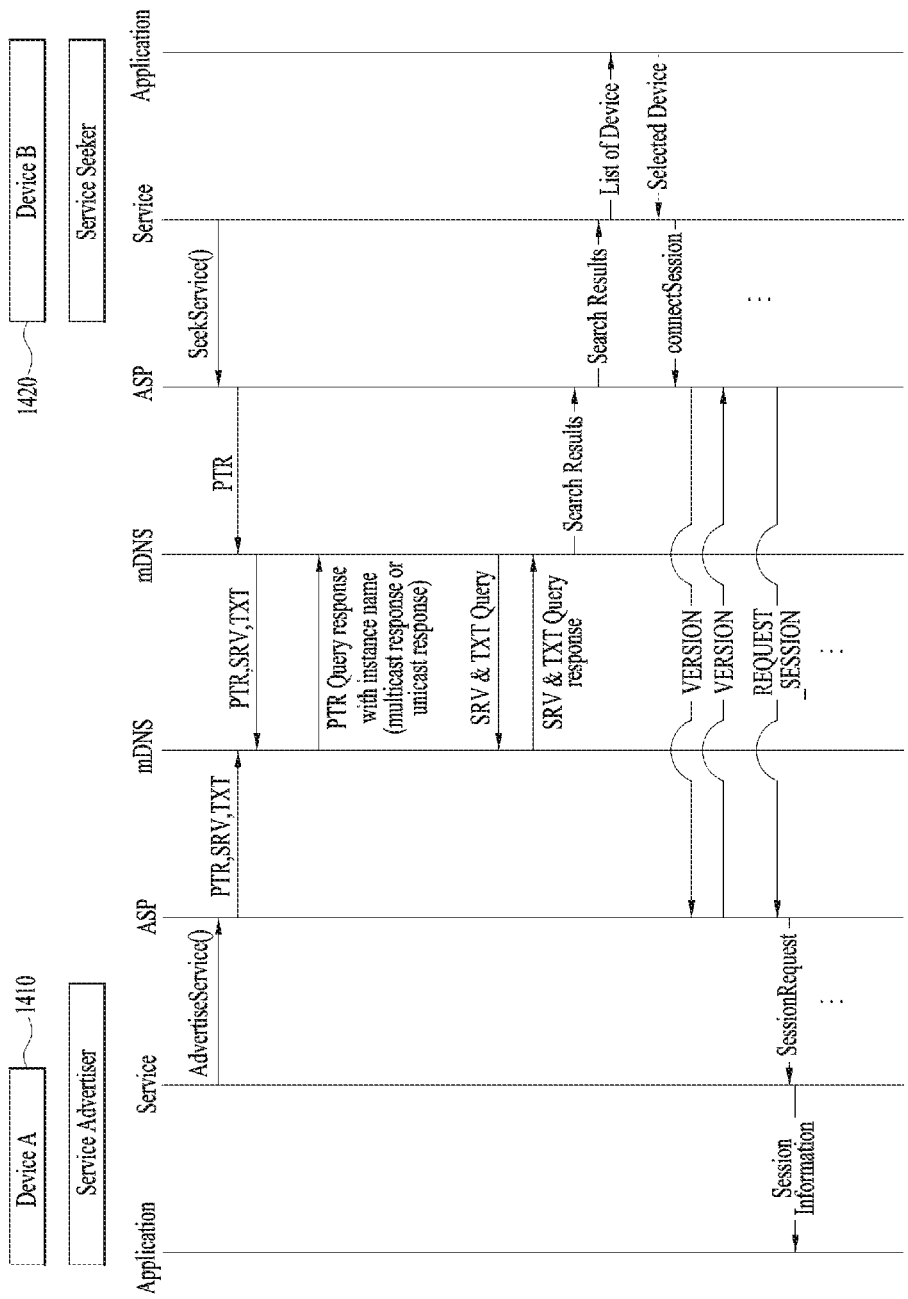
FIG. 14 is a diagram showing an operation method based on WLAN infrastructure service discovery and WLAN infrastructure connection.

FIG. 14 is a diagram showing an operation method based on WLAN infrastructure service discovery and WLAN infrastructure connection.

As described above with reference to FIG. 13, a seeker UE 1420 may perform discovery using an mDNS. At this time, the ASP stage of the seeker UE 1420 may acquire search result information based on the mDNS. Thereafter, the ASP stage of the seeker UE 1420 may call a search result event from the service/application stage and provide a search result. Thereafter, the service/application stage of the seeker UE 1420 may call a ConnectSession( ) method. At this time, the seeker UE 1420 may check the version of an ASP Coordination Protocol. Thereafter, the seeker UE 1420 may transmit a Request_Session message to an advertiser UE 1410, when mutual version check with the advertiser UE 1410 ends. To this end, the seeker UE 1420 and the advertiser UE 1410 may perform discovery using the mDNS and perform connection using the WLAN Infrastructure. At this time, for example, the seeker UE 1420 and the advertiser UE 1410 may operate using a post-association method based on a legacy ASP CP. At this time, for example, the ConnectSession( ) method called by the service/application stage of the seeker UE 1420 may include Service MAC, Advertisement ID and Session Information. To this end, the seeker UE 1420 may acquire information on the advertiser UE 1410 and perform session connection. In addition, for example, the Request Session message may include Session MAC, Session_ID, Advertisement_ID and Session Information. That is, the Request Session message transmitted by the seeker UE 1420 may include information necessary to set up an ASP session. Thereafter, the ASP session may be set up based on Advertisement ID and Session Information.

Figure 15:
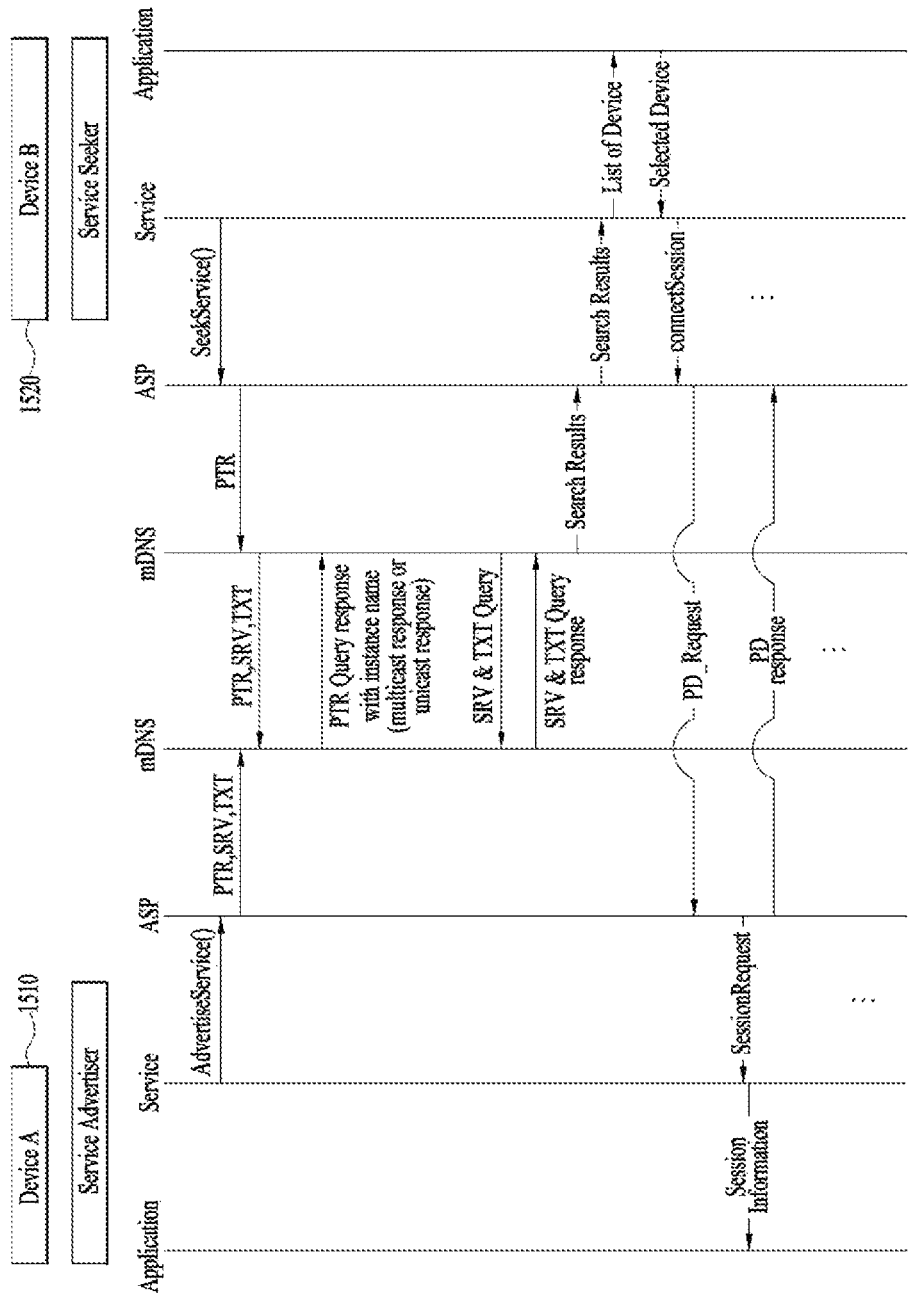
FIG. 15 is a diagram showing an operation method based WLAN infrastructure service discovery and P2P connection.
Figure 16:
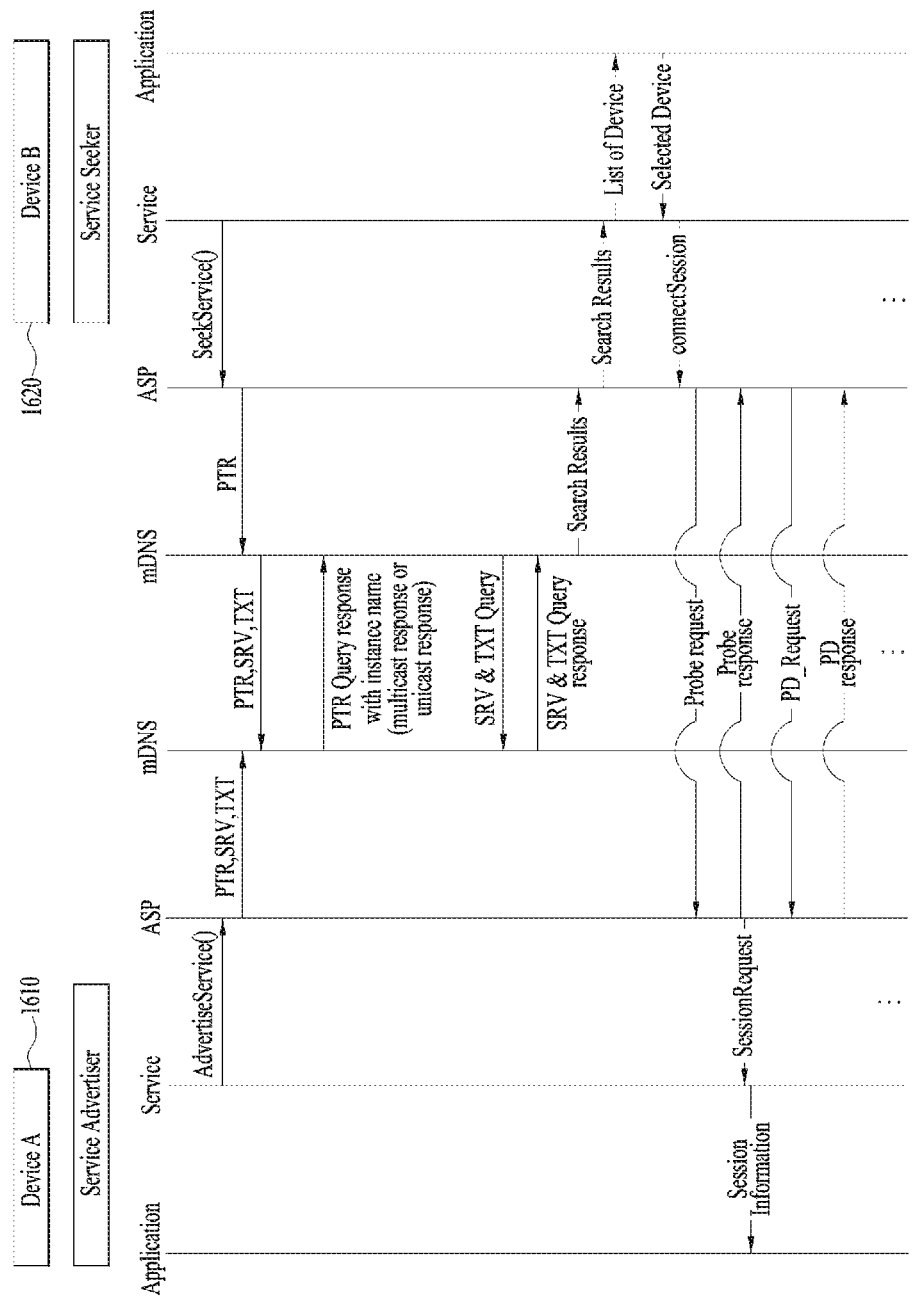
FIG. 16 is a diagram showing an operation method based WLAN infrastructure service discovery and P2P connection.

FIGS. 15 and 16 are diagrams showing an operation method based WLAN infrastructure service discovery and P2P connection. As described above with reference to FIG. 13, the seeker UE may perform discovery using the mDNS. At this time, the ASP stage of the seeker UE may acquire search result information based on the mDNS. Thereafter, the ASP stage of the seeker UE may call a search result event from the service/application stage and provide a search result. Thereafter, the service/application stage of the seeker UE may call a ConnectSession( ) method.

At this time, for example, in FIG. 15, a seeker UE 1520 and an advertiser UE 1510 may set up an ASP session based on P2P connection. At this time, for example, after calling the ConnectSession( ) method, the seeker UE 1520 may transmit a provision discovery (PD) request message to the advertiser UE 1510. At this time, for example, as information necessary for ConnectSession( ), Advertisement ID, Service MAC and Session Information may be exchanged in the above-described mDNS discovery procedure. Thereafter, the PD request message may include Band/Channel information and Time information. Thereafter, the seeker UE 1520 may receive a PD response message from the advertiser UE 1510. To this end, the seeker UE 1520 and the advertiser UE 1510 may set up an ASP session based on P2P connection.

In addition, for example, in FIG. 16, based on P2P connection, a Probe Request message may be transmitted from the seeker UE 1620 to the advertiser UE 1610. Thereafter, a Probe Response message may be transmitted from the advertiser UE 1610 to the seeker UE 1620. Thereafter, the above-described PD request/response message may be exchanged between the seeker UE 1620 and the advertiser UE 1610. At this time, for example, in a process of performing discovery using the mDNS, Band/Channel and/or time information necessary for P2P connection may be included and transmitted. To this end, the channel and time for exchanging the probe request/response message can be checked in advance, thereby efficiently performing search.

Figure 17:
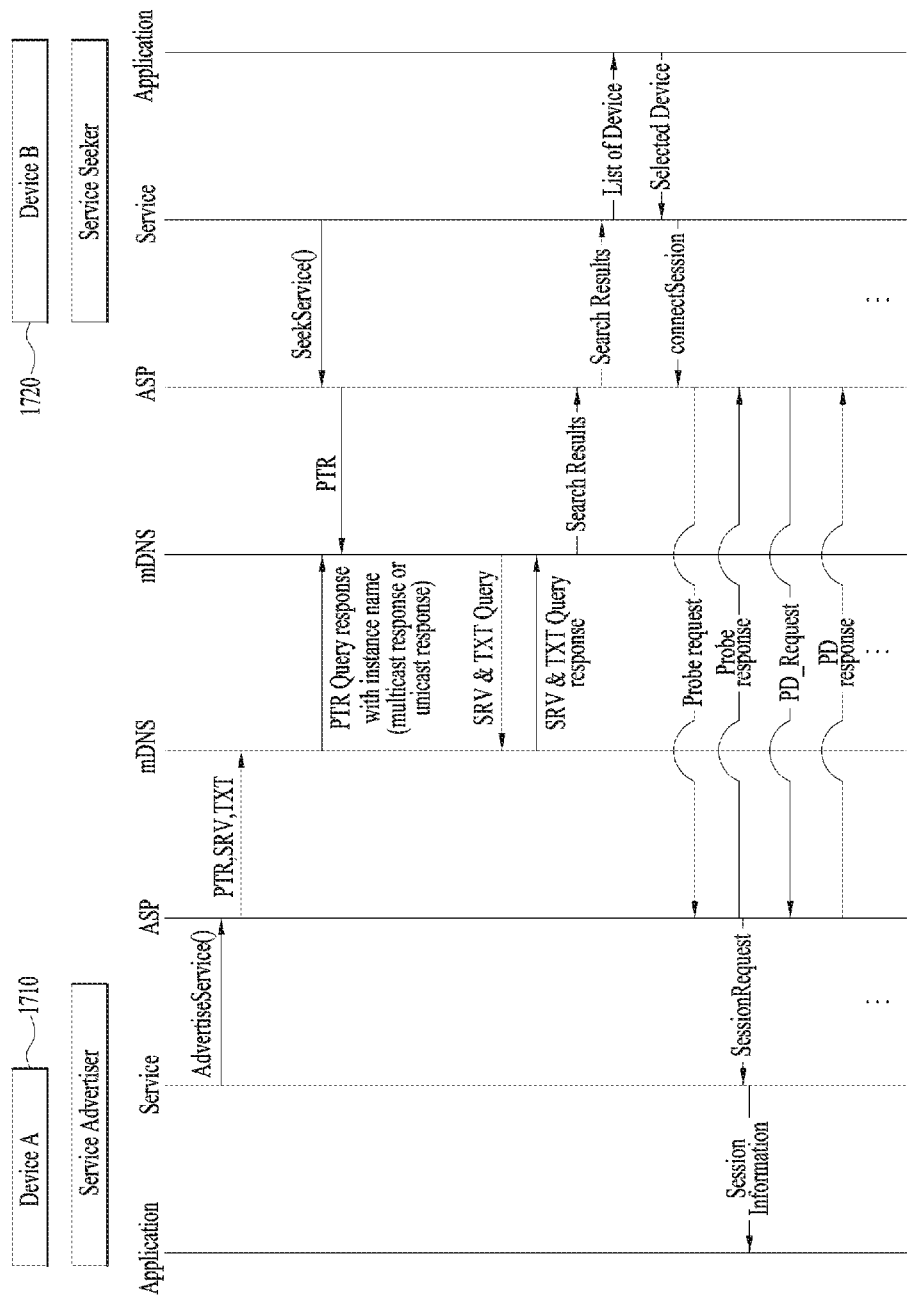
FIG. 17 is a diagram showing an operation method based on WLAN infrastructure service discovery and P2P connection.

FIG. 17 is a diagram showing an operation method based on WLAN infrastructure service discovery and P2P connection.

In FIG. 17, a seeker UE 1720 may receive and cache a query response transmitted by an advertiser UE 1710. More specifically, the advertiser UE 1710 may transmit a query response including information on a PTR record, an SRV record and a TXT record to the seeker UE 1720 based on an AdvertiseService( ) method using an mDNS. At this time, the seeker UE 1720 may cache the query response. Thereafter, the service/application stage of the seeker UE 1720 may call a SeekService( ) method. At this time, the ASP stage of the seeker UE 1720 may convert information on a service to be searched into an mDNS interface and provide the mDNS interface as the PTR record. At this time, the seeker UE 1720 may perform matching of the cached information with the information on the PTR record and transmit an SRV and/or TXT query message to the advertiser UE 1710. That is, information on the advertiser UE 1720 may be included as information cached before the seeker UE 1720 performs service discovery.

In addition, for example, in the case where the ASP of the UE supports discovery through the mDNS, when the mDNS is associated with the AP (WLAN Infrastructure), information may be cached through function activation. At this time, for example, this may be irrelevant to whether the UE is the seeker UE 1720 or the advertiser UE 1710.

At this time, for example, when the ASP of the UE is associated with the AP upon operation, an interface may be defined between the mDNS and the ASP such that the mDNS caches information. At this time, operation for the interface may be defined as shown in Table 8 below. In addition, for example, upon association with the AP, the interface may implicitly operate and the mDNS may cache information. At this time, for example, "statusmDNS( )" may be defined. At this time, "statusmDNS( )" may provide the status information of the mDNS to the ASP.

TABLE 8

| |
|---|
| startmDNS( ) : mDNS stop, |
| stopmDNS( ): mDNS end, |
| pausemDNS( ): mDNS pause, |
| resumeMDNS( ): mDNS resume, |
| getCache( ) : operation for reporting cached information to ASP2. |

Figure 18:
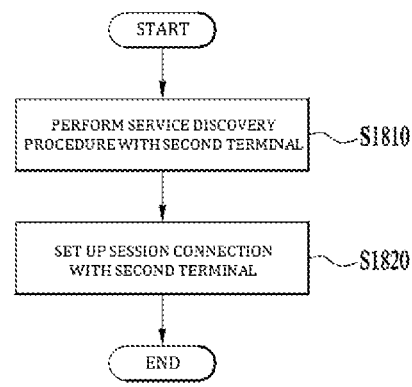
FIG. 18 is a flowchart illustrating a method of, at a UE, performing discovery according to an embodiment of the present specification.

FIG. 18 is a flowchart illustrating a method of, at a UE, performing discovery according to an embodiment of the present specification.

A first UE and a second UE may perform a service discovery procedure (S1810). At this time, as described above with reference to FIGS. 10 to 17, the first UE may be a seeker UE. In addition, the second UE may be an advertiser UE. At this time, the first UE and the second UE may perform discovery based on an ASP. At this time, for example, the ASP may support a plurality of interfaces. At this time, discovery may be performed based on the ASP through WLAN Infrastructure. At this time, for example, discovery may be performed using an mDNS. For example, the ASP stage of the seeker UE may convert search information into an interface for the mDNS and provide the interface, based on the method called from the service/application stage. At this time, the seeker UE may provide the search information to the advertiser UE through a PTR query. Thereafter, a PTR query response may be received from the advertiser UE to check a service type. Thereafter, the seeker UE may transmit an SRV and/or TXT query to the advertiser UE. Thereafter, an SRV and/or query response may be received to end discovery. At this time, for example, the SRV and/or TXT query may include a TXT record. At this time, the TXT record may include additional information of a service. At this time, for example, the TXT record may mandatorily include advertiser ID information. In addition, for example, the TXT record may mandatorily include Service MAC information, as described above. In addition, information necessary for ASP session connection may be mandatorily or optionally included, as described above.

Next, the first UE and the second UE may perform session connection (S1820). At this time, as described above with reference to FIGS. 10 to 18, session connection may be performed based on any one of WLAN Infrastructure connection or P2P connection. At this time, for example, necessary information may be included in a message exchanged in a discovery procedure based on a session connectivity method, as described above.

Figure 19:
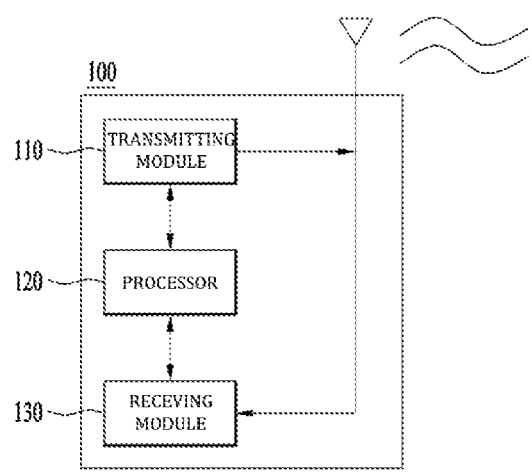
FIG. 19 is a block diagram showing a UE apparatus according to an embodiment of the present specification.

FIG. 19 is a block diagram showing a UE apparatus according to an embodiment of the present specification.

The UE apparatus may be a UE capable of performing discovery using WLAN Infrastructure. At this time, the UE apparatus 100 may include a transmission module 110 for transmitting a wireless signal, a reception module 130 for receiving a wireless signal and a processor 120 for controlling the transmission module 110 and the reception module 130. At this time, the UE 100 may perform communication with an external device using the transmission module 110 and the reception module 130. At this time, the external device may be another UE apparatus. For example, the external device may be another UE apparatus connected through P2P or an AP or non-AP apparatus connected through the WLAN Infrastructure. As another example, the external device may be a base station. That is, the external device may be an apparatus capable of performing communication with the UE apparatus 100, without being limited to the above-described embodiment. The UE apparatus 100 may transmit and receive digital data such as content using the transmission module 110 and the reception module 130.

According to one embodiment of the present invention, the processor 120 of the UE apparatus 100 may perform a service discovery procedure with another UE. At this time, for example, the UE apparatus 100 may be the above-described seeker or advertiser UE. Thereafter, the UE apparatus may set up session connection with another UE based on a service discovery procedure. At this time, the service discovery procedure may be performed through the mDNS based on the ASP, as described above. In addition, when the service discovery procedure is performed based on the mDNS, a PTR query message may be exchanged between the seeker UE and the advertiser UE. Thereafter, an SRV and/or TXT query message may be exchanged between the seeker UE and the advertiser UE. At this time, as described above, the TXT record of the SRV and/or TXT query message may mandatorily include Advertisement ID information, as described above.

The invention claimed is:

1. A method of performing service discovery at a first user equipment (UE) in a wireless communication system, the method comprising:
performing a service discovery procedure with a second UE using a multicast domain name system (mDNS) based on an application service platform (ASP); and
setting up session connection with the second UE based on P2P connection,
wherein the service discovery procedure includes a step of exchanging a pointer (PTR) query message based on the mDNS and a step of exchanging a service (SRV) and text (TXT) query messages,
wherein a TXT record of the SRV and TXT query message mandatorily includes Advertisement ID information of a service,
wherein the session is set up when the first UE transmits a provision discovery (PD) request message to the second UE after the service discovery procedure and receives a PD response message from the second UE, and
wherein band information and time information necessary for exchange of the PD request message and the PD response message are further included in the TXT record.

2. The method according to claim 1, wherein the TXT record further includes additional information of the service.

3. The method according to claim 2, wherein the additional information of the service includes at least one of Session Info, Service MAC, ASP Network, Multi Session Capability, Multiple band Capability, Band preference, Connectivity Method, P2P Network role, and P2P Config Method.

4. The method according to claim 3, wherein, when the session is set up based on the service discovery procedure, the TXT record further mandatorily includes the service MAC information of the additional information.

5. A first user equipment (UE) for performing service discovery in a wireless communication system, the first UE comprising:
a reception module configured to receive information from an external device;
a transmission module configured to transmit information to an external device; and
a processor configured to control the reception module and the transmission module,
wherein the processor:
performs a service discovery procedure with a second UE using a multicast domain name system (mDNS) based on an application service platform (ASP); and
sets up session connection with the second UE based on P2P connection,
wherein the service discovery procedure includes a step of exchanging a pointer (PTR) query message based on the mDNS and a step of exchanging a service (SRV) and text (TXT) query messages,
wherein a TXT record of the SRV and TXT query message mandatorily includes Advertisement ID information of a service,
wherein the session is set up when the first UE transmits a provision discovery (PD) request message to the second UE after the service discovery procedure and receives a PD response message from the second UE, and
wherein band information and time information necessary for exchange of the PD request message and the PD response message are further included in the TXT record.

6. The first UE according to claim 5, wherein the TXT record further includes additional information of the service.

7. The first UE according to claim 6, wherein the additional information of the service includes at least one of Session Info, Service MAC, ASP Network, Multi Session Capability, Multiple band Capability, Band preference, Connectivity Method, P2P Network role, and P2P Config Method.

8. The first UE according to claim 7, wherein, when the session is set up based on the service discovery procedure, the TXT record further mandatorily includes the service MAC information of the additional information.

* * * * *